US00RE34833E

United States Patent [19]

Hasegawa et al.

[11] E Patent Number: Re. 34,833

[45] Reissued Date of Patent: Jan. 17, 1995

[54] VEHICLE TRANSMISSION ASSEMBLY

[75] Inventors: Toshiyuki Hasegawa, Ashiya; Shigenori Sakigawa, Itami; Ryota Ohashi, Sakai, all of Japan

[73] Assignee: Kanzaki Kokyukoki Mfg. Co., Ltd., Amagasaki, Japan

[21] Appl. No.: 119,264

[22] Filed: Sep. 9, 1993

Related U.S. Patent Documents

Reissue of:

[64] Patent No.: 5,046,994
Issued: Sep. 10, 1991
Appl. No.: 607,864
Filed: Nov. 1, 1990

[30] Foreign Application Priority Data

Nov. 20, 1989 [JP] Japan ..... 1-301197

[51] Int. Cl.[6] ..... F16H 37/08

[52] U.S. Cl. ..... 475/83; 74/15.2; 180/53.1; 475/200

[58] Field of Search ..... 74/15.2, 15.6; 475/83, 475/200; 180/53.1, 53.4, 53.7, 53.8

[56] References Cited

U.S. PATENT DOCUMENTS

| | | | |
|---|---|---|---|
| 3,131,580 | 5/1964 | Forster | 74/720 |
| 3,922,931 | 12/1975 | Osujyo et al. | 74/745 |
| 4,145,883 | 3/1979 | Forster | 60/458 |
| 4,262,768 | 4/1981 | Itatani et al. | 180/242 |
| 4,579,183 | 4/1986 | Irikura et al. | 180/53.1 |
| 4,862,767 | 9/1989 | Hauser | 74/687 |
| 4,880,070 | 11/1989 | Irikura | 180/53.1 |
| 4,974,472 | 12/1990 | Nishimura et al. | 74/718 |

FOREIGN PATENT DOCUMENTS

| | | |
|---|---|---|
| 62-210132 | 9/1987 | Japan . |
| 1-17883 | 4/1989 | Japan . |
| 1-175526 | 7/1989 | Japan . |

*Primary Examiner*—Dirk Wright

[57] ABSTRACT

In a vehicle transmission assembly which includes a hydrostatic transmission (14) and mechanical transmission mechanism (21) for driving rear wheel axles (20) of the vehicle at a variable speed, a hydraulic pump (16) and hydraulic motor (17) of the hydrostatic transmission are mounted on a plate member (30), secured to a front of a transmission casing (15), at an upper and lower locations such that only the motor is disposed within the transmission casing at a location above the mechanical transmission mechanism. The mechanical transmission mechanism includes plural transmission shafts (31, 32, 33) all extending laterally of the transmission casing and is connected drivenly to the motor. Pump shaft (18) of the hydraulic pump is adapted to drive at least one of a rear-PTO shaft (23) and mid-PTO shaft (24) through a drive shaft (41) disposed co-axially with the pump shaft, a fluid-operated PTO-clutch (42) mounted on the drive shaft, and a gear train (43; 143; 243) disposed at a rear end portion within the transmission casing. A compactness of the transmission assembly and turnability of the vehicle with a small radius of turn are assured.

19 Claims, 5 Drawing Sheets

VEHICLE TRANSMISSION ASSEMBLY

Matter enclosed in heavy brackets [ ] appears in the original patent but forms no part of this reissue specification; matter printed in italics indicates the additions made by reissue.

FIELD OF THE INVENTION

This invention relates to a transmission assembly for use in transmitting vehicle-driving power and auxiliary implement-driving power in a relatively small-sized vehicle, such as a mower tractor having a mid-mount mower.

BACKGROUND OF THE INVENTION

In a relatively small-sized vehicle which requires a small-sized transmission assembly for propelling the vehicle, a transmission assembly is often employed in which a hydrostatic transmission which may be designed in a compact fashion, and a mechanical transmission mechanism, which is designed in a compact fashion, are connected in series. And, in a case where the mechanical transmission mechanism is disposed within a transmission casing which supports left and right rear wheel axles for driving the vehicle through left and right rear wheels, the hydrostatic transmission is often mounted on an outer surface of the transmission casing. Pump shaft of the hydraulic pump of such hydrostatic transmission is often used as a power source for a rear-PTO (power take-off) shaft which extends rearwardly from the transmission casing for driving an auxiliary implement, such as a grass collector, to be drawn by the vehicle. The pump shaft is often used further as a power source for a mid-PTO shaft which extends forwardly from the transmission casing for driving an auxiliary implement of mid-mount type, such as a mid-mount mower, to be mounted at an underside of the vehicle and between front and rear wheels.

Typical examples of the vehicle transmission assembly of this type are disclosed in JP, B2 No.1-17883; JP, A No.62210132; and JP, A No.1-175526.

In the transmission assembly disclosed in JP, B2 NO.1-17883,a hydrostatic transmission comprising a hydraulic pump and hydraulic motor which are disposed respectively at higher and lower levels is mounted on a front surface of a transmission casing. Within the transmission casing, there are disposed not only a mechanical transmission mechanism for transmitting vehicle-driving power but another mechanical transmission mechanism for transmitting auxiliary implement-driving power to a rear-PTO shaft, extending rearwardly from the transmission casing, and to a mid-PTO shaft which extends forwardly from the transmission casing at a level below the hydrostatic transmission. In correspondence to the pump and motor arrangement in the hydrostatic transmission that the hydraulic motor having a motor shaft from which vehicle-driving power is transmitted into the transmission casing is located below the hydraulic pump having a pump shaft from which auxiliary implement-driving power is transmitted into the transmission casing, the mechanical transmission mechanism for transmitting vehicle-driving power is disposed at a lower half within the transmission casing while the mechanical transmission mechanism for transmitting auxiliary implement-driving power is disposed at an upper half within the casing. The transmission mechanism for transmitting auxiliary implement-driving power includes a fluid-operated frictional PTO-clutch which is operable to connect selectively between a drive shaft, which is disposed at a high level within the transmission casing and is coupled to the pump shaft, and a clutch shaft which is disposed below the drive shaft and on which the PTO-clutch is mounted.

In the transmission assembly disclosed in this JP, B2 NO.1-17883, the mechanical transmission mechanism for transmitting vehicle-driving power within the transmission casing includes transmission shafts, which extend axially of the transmission casing, and a differential gearing which is disposed behind the transmission shafts and has, as its output shafts, left and right rear wheel axles. Consequently, the transmission casing is still pretty large in axial length. Further, the rear wheel axles are located at a rearmost portion of the transmission assembly having the hydrostatic transmission and transmission casing so that turnability with a small radius of turn is not assured particularly when the transmission assembly is located in a vehicle as rearwards as possible so as to secure a large axial space for a mid-mount mower or the like between front and rear wheels. With respect to a small-sized vehicle, turnability with a small radius of turn is very important.

The transmission assembly disclosed in JP, A No.62-210132 is intended to eliminate the problems set forth above and comprises a hydrostatic transmission which is located at a rearmost portion in the transmission assembly. The hydrostatic transmission comprises a hydraulic pump and hydraulic motor which are disposed respectively at higher and lower levels. To a lower half of front surface of the hydrostatic transmission, a transmission casing is attached at an upper half of the casing into which a motor shaft of the hydrostatic transmission extends. Within the transmission casing, a mechanical transmission mechanism for transmitting vehicle-driving power is disposed which includes plural transmission shafts all extending laterally of the transmission casing and which is connected drivenly to the motor shaft through a bevel gearing. Pump shaft of the hydraulic pump has an input end extending forwardly at a level above the transmission casing. This pump shaft also extends rearwardly so as to be used as a rear-PTO shaft.

In the transmission assembly according to this JP, A No.62-210132, axial length of the transmission casing is largely reduced owing to the lateral arrangement of all of the transmission shafts. Further, left and right rear wheel axles supported by the transmission casing which is arranged in front of the hydrostatic transmission are located at a foremost portion of the transmission assembly so that, even when the transmission assembly is located in a small-sized vehicle as rearwards as possible, turnability of the vehicle with a small radius of turn is well secured.

On the other hand, the level of the pump shaft which is used as a rear-PTO shaft is too high so that a transmission shaft for connecting the pump shaft to an input shaft of a grass collector or the like takes a large inclination resulting in generation of a large noise at universal joints at the ends of the transmission shaft. Another problem consists in how a PTO-clutch is provided. Further, the transmission assembly disclosed in this JP, A No.62-210132 does not permit to use the pump shaft as a power source for driving an auxiliary implement of mid-mount type such as a mid-mount mower. Indeed, in the mower tractor disclosed in this literature, it is fashioned that power for driving a mid-mount mower is taken off directly from an engine.

Finally, the transmission assembly disclosed in JP, A No.1-175526 is fashioned, similarly to the one disclosed in JP, B2 No.1-17883, such that a hydrostatic transmission comprising a hydraulic pump of a higher level and a hydraulic motor of a lower level is mounted on a front surface of a transmission casing within which a mechanical transmission mechanism for transmitting vehicle-driving power, having forwards and rearwards extending transmission shafts, is disposed at a lower half of the casing. In the transmission assembly disclosed in this JP, A No.1-175526, however, a drive shaft which is disposed at a high level within the transmission casing and is coupled to a pump shaft of the hydraulic pump extends rearwardly from the transmission casing. On a rear end portion of this drive shaft, a hollow clutch shaft extending through a rear end cover of the transmission casing is rotatably mounted which is connected selectively to the drive shaft by an electromagnetic PTO-clutch disposed on the rear of the transmission casing. The clutch shaft is connected drivingly to a rear-PTO shaft, extending rearwardly from the transmission casing, and to a mid-PTO shaft, extending forwardly from the transmission casing at a level below the hydrostatic transmission, through gear trains which are disposed at a rear end portion within the transmission casing.

As compared to a PTO-clutch disposed within a transmission casing, a PTO-clutch disposed at a location outside of a transmission casing such as the one set forth above will heighten the freedom of design of a transmission assembly and, also, will make the assembly procedure and maintenance of it easier. However, it requires to take measures for safety and against water and dust. A fluid-operated frictional clutch which may be engaged in a smooth manner with ease cannot be employed as a PTO-clutch to be disposed at an outside of a transmission casing, because a fluid-operated frictional clutch has a structure such that oil for lubricating frictional elements of the clutch may overflow out of its clutch housing.

OBJECT

Accordingly, a primary object of the present invention is to provide a novel transmission assembly, for use in relatively small-sized vehicles, which is reduced in size in a fashion such that it assures turnability of a vehicle with a small radius of turn, which permits to provide a rear-PTO shaft, to be driven by a pump shaft of hydrostatic transmission through a PTO-clutch disposed within a transmission casing, at an appropriate level, and which permits to provide a mid-PTO shaft so as to be driven also by the pump shaft and so as not to sacrifice a compactness of the transmission assembly.

BRIEF DESCRIPTION OF THE DRAWINGS

Other objects and advantages of the invention will become readily apparent as the specification is considered in conjunction with the accompanying drawings in which.

In the drawings, like numerals designate like parts throughout the several views thereof.

SUMMARY OF THE INVENTION

Figure 1:
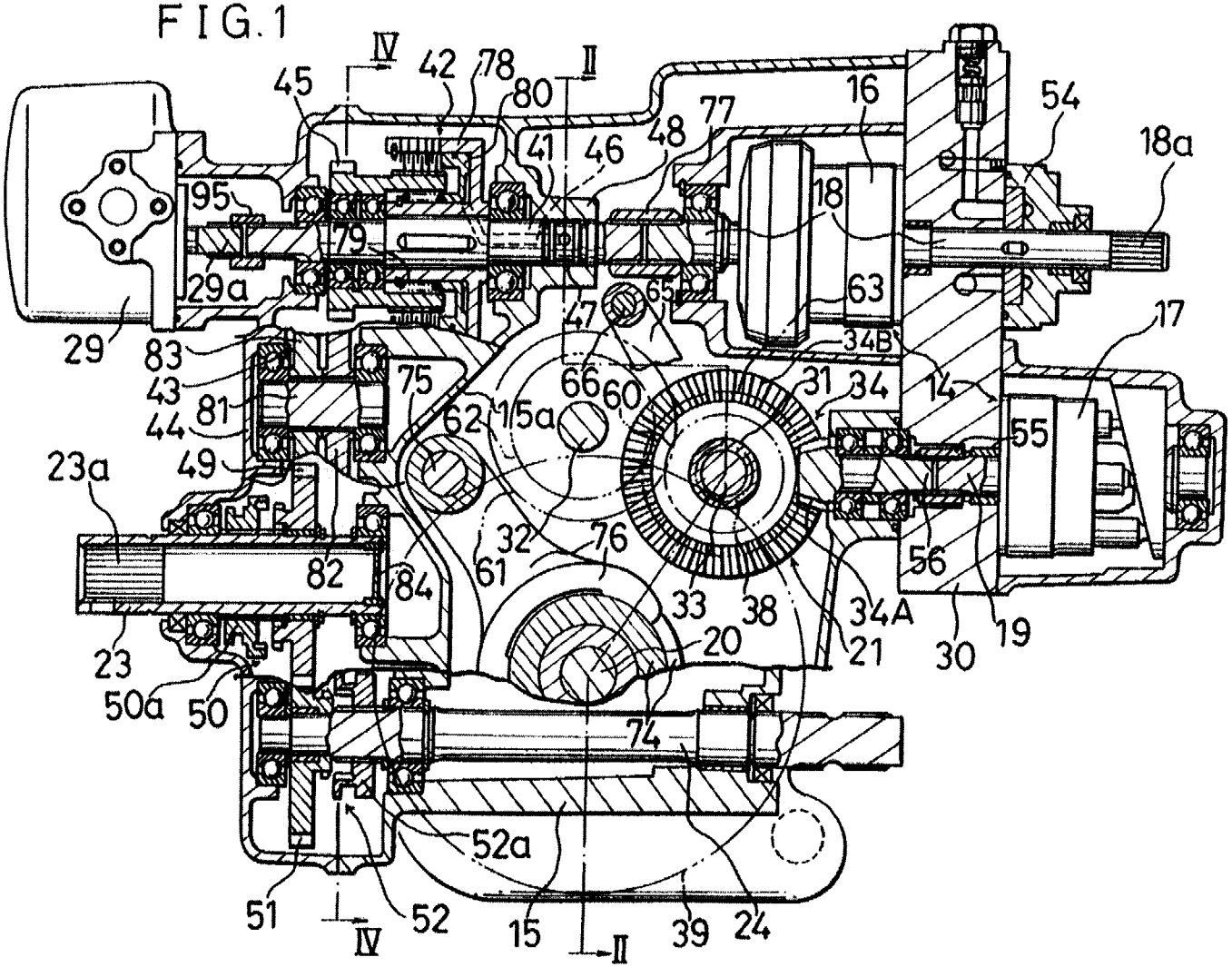
FIG. 1 is a sectional side view, partially cut away and partially developed, of a first embodiment of the transmission assembly according to the present invention.
Figure 2:
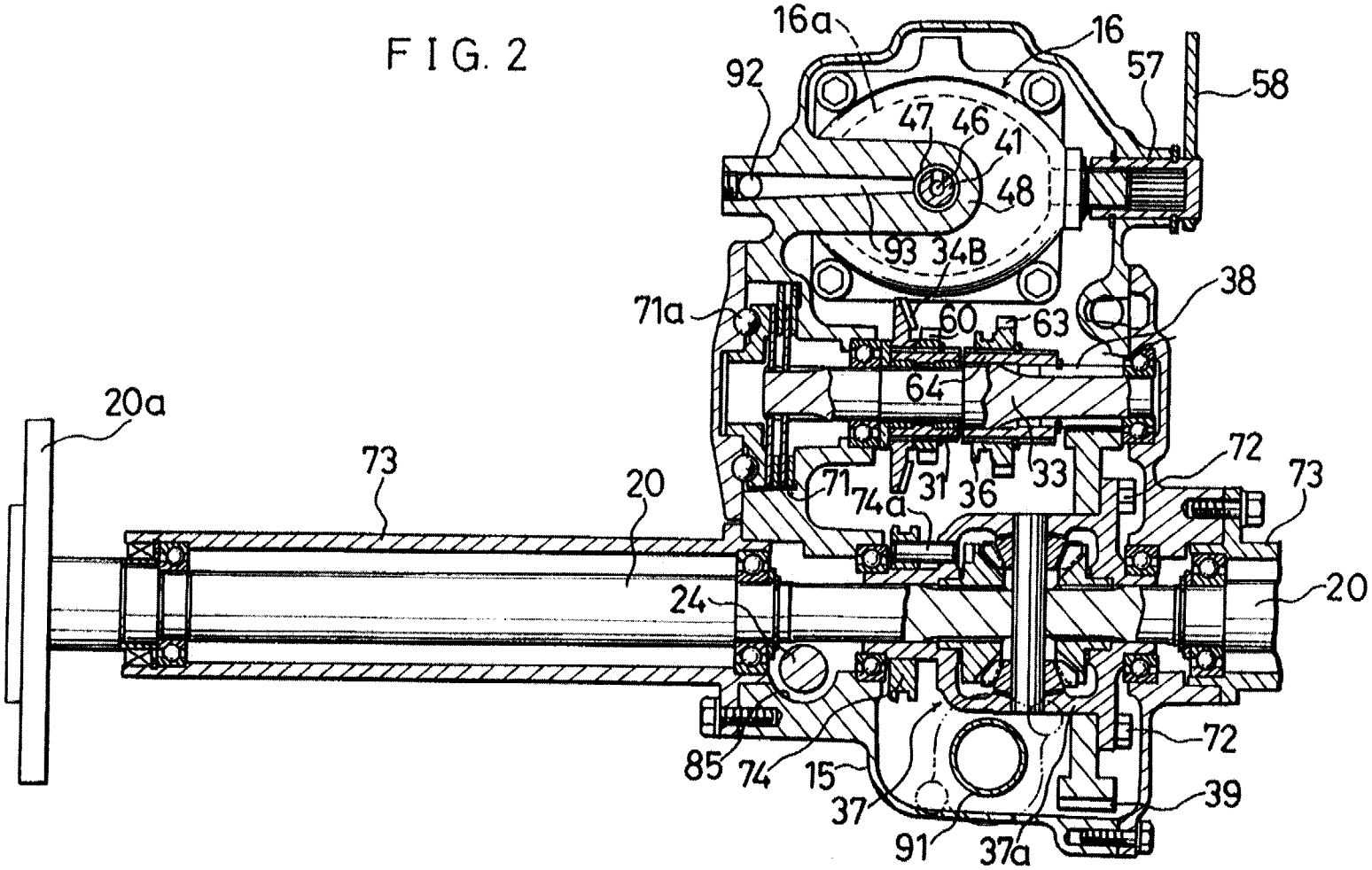
FIG. 2 is a sectional view taken generally along line II—II of FIG. 1.
Figure 6:
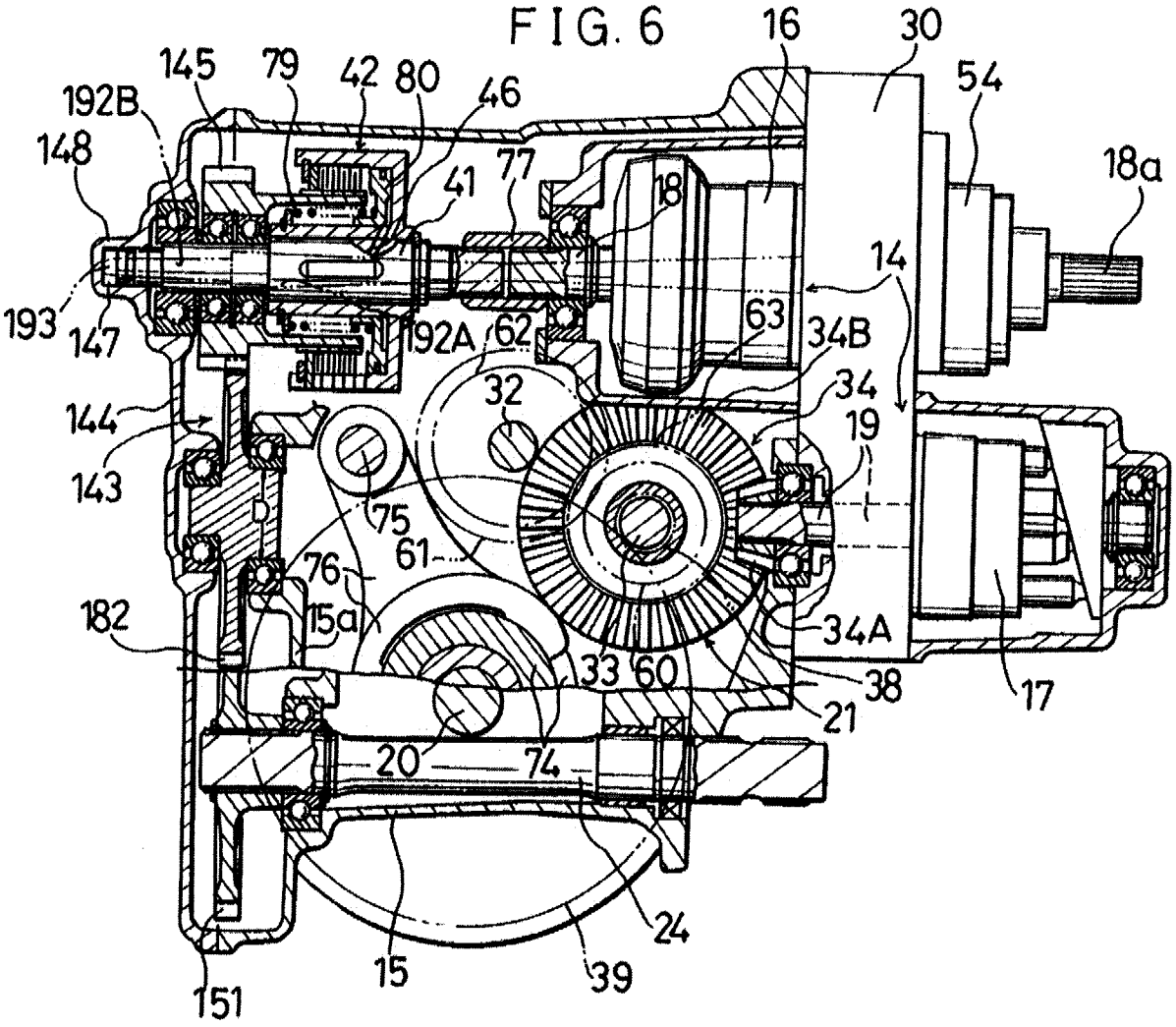
FIG. 6 is a sectional side view similar to FIG. 1, but showing a second embodiment of the transmission assembly according to the present invention.

The present invention relates to a transmission assembly which comprises, as depicted respectively in FIGS. 1 and 2 and in FIG. 6, a hydostatic transmission 14 which includes a hydraulic pump 16 having a pump shaft 18 and a hydraulic motor 17 having a motor shaft 19. The transmission assembly further comprises a mechanical transmission mechanism 21 which is disposed within a transmission casing 15 for transmitting vehicle-driving power to left and right rear wheel axles 20 supported by the transmission casing. The motor shaft 19 is connected drivingly to the rear wheel axles 20 through the transmission mechanism 21, whereas the pump shaft 18 is connected drivingly to at least one of a rear-PTO shaft 23 and mid-PTO shaft 24 for taking-off auxiliary implement-driving power.

As shown respectively in FIG. 1 and in FIG. 6, the transmission assembly is fashioned according to the present invention to include a plate member 30 which is fixedly secured to a front of the transmission casing 15. The hydraulic pump 16 is mounted on a rear surface of the plate member 30 and is disposed at an upper portion within the transmission casing 15 in a condition such that an input end 18*a* of the pump shaft 18 extends forwardly of the plate member 30, whereas the hydraulic motor 17 is mounted on a front surface of the plate member 30 at a level lower than that of the hydraulic pump in a condition such that the motor shaft 19 extends rearwardly from the motor.

Figure 3:
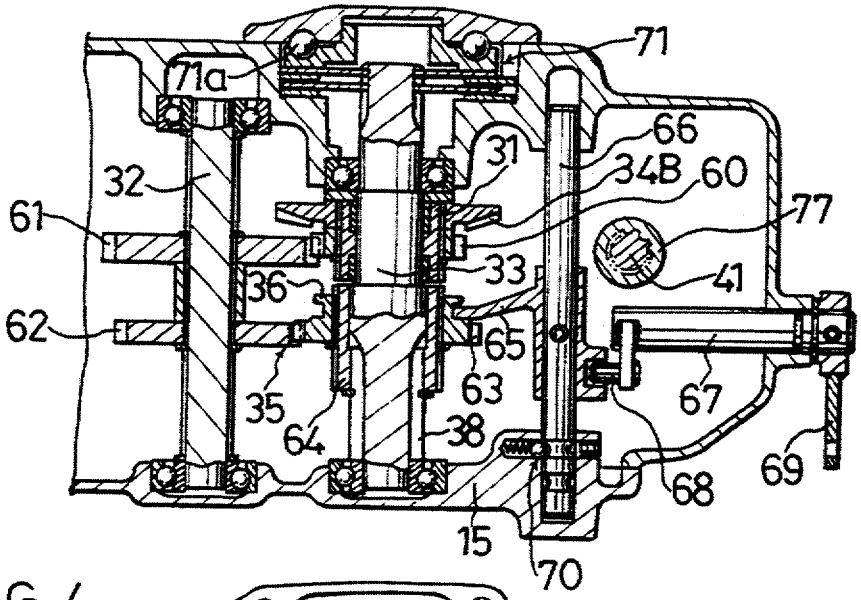
FIG. 3 is a sectional view, partially developed, of a part of the transmission assembly shown in FIG. 1.

As shown respectively in FIGS. 1 to 3 and in FIG. 6, the mechanical transmission mechanism 21 is disposed within the transmission casing 15 at a level lower than that of the hydraulic pump 16 and is fashioned to include plural transmission shafts 31, 32 and 33 all of which extend leftwards and rightwards of the transmission casing. This transmission mechanism 21 is connected drivenly to the motor shaft 19 through a bevel gearing 34.

Figure 4:
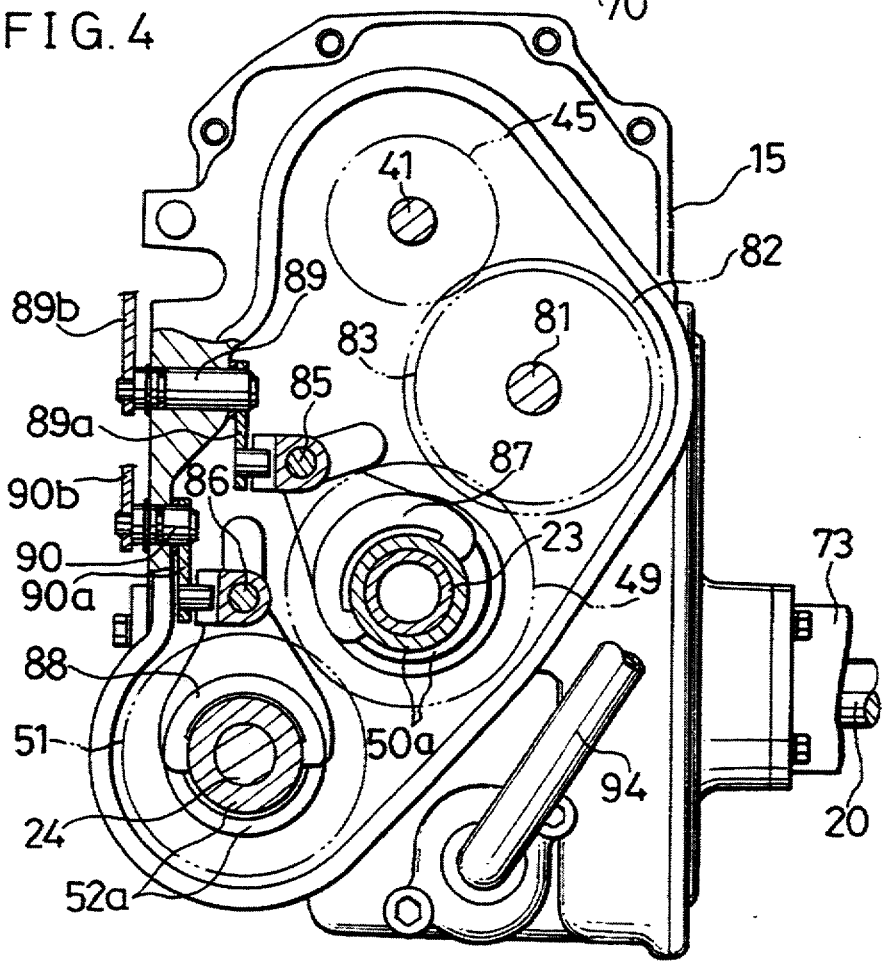
FIG. 4 is a sectional view, partially omitted, taken generally along line IV-IV of FIG. 1.
Figure 7:
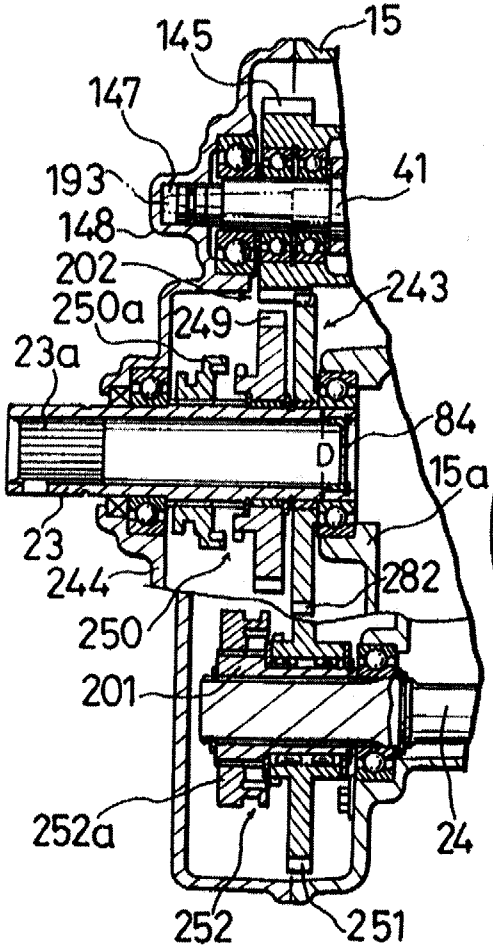
FIG. 7 is a sectional side view showing a modification of a part of the second embodiment shown in FIG. 6.

As shown respectively in FIGS. 1 and 4 and in FIG. 6, a drive shaft 41 is disposed within the transmission casing 15 rearwardly of the hydraulic pump 16 and co-axially with the pump shaft 18. The pump shaft extends rearwardly from the pump 16 and is coúpled to the drive shaft 41. The drive shaft is connected drivingly to one of the PTO shafts 23 (FIGS. 1 and 4) or 24 (FIG. 6; FIG. 7) through a PTO-clutch 42, which is mounted on the drive shaft 41, and through a gear train 43 (FIGS. 1 and 4); 143 (FIG. 6); or 243 (FIG. 7) which is disposed at a rear end portion within the transmission casing 15.

The transmission assembly according to the present invention having the structure set forth above will reduce the axial length of the transmission casing 15, because all of the plural transmission shafts 31, 32 and 33 of the mechanical transmission mechanism 21 within the transmission casing extend laterally of the casing 15 so that the transmission mechanism 21 may largely be reduced in size in the axial direction of the transmission casing, as compared to a transmission mechanism which includes transmission shafts extending forwards and rearwards, and because the gear train 43, 143 or 243 in the power take-off line is disposed between the drive shaft 41 and PTO shaft 23 or 24, both of which extend axially of the transmission casing 15, so that this gear train may be disposed within a narrow space as viewed in the axial direction of the transmission casing. The hydraulic pump 16 of the hydrostatic transmission and the PTO-clutch 42 each having a relatively large axial length may be disposed within an axial span occupied by the transmission mechanism 21 and gear train 43, 143 or 243 of the underside owing to the structure that the drive shaft 41 mounting the PTO-clutch 42 is coupled directly to the pump shaft 18. The arrangement of these hydraulic pump 16 and PTO-clutch 42 leaves no substantial dead space in the upper portion within the transmission casing 15. Turnability of a vehicle with a small readius of turn is assured, because the lateral arrangement of plural shafts 31, 32 and 33 of the mechanical transmission mechanism 21 will reduce the axial interval between the power input point by means of motor shaft 19 and the position of rear wheel axles 20 so that the rear wheel axles are located as forwardly as possible within the axial length of the transmission casing 15.

Owing to the arrangement with respect to the hydrostatic transmission 14 that only the hydraulic motor 17 of a lower position is mounted on the front of the transmission casing 15 and the hydraulic pump 16 is located within the transmission casing, position of a joint between the pump shaft 18 and a transmission shaft for transmitting power of an engine to the pump shaft is replaced considerably rearwardly, as compared to an arrangement that the hydraulic pump is mounted also on the front of the transmission casing 15, so that an operator on a seat, which is usually disposed above the transmission casing, is well released from apprehension with respect to his feet. As already described, the hydraulic pump 16 disposed within the transmission casing leaves no substantial dead space within the casing 15. In addition, the hydraulic motor 17 disposed on the front of the transmission casing contributes to a reduction of the axial length of the casing 15 and to a frontward location of the rear wheel axles 20. The plate member 30 supporting the hydraulic pump 16 and motor 17 of the hydrostatic transmission 14 may be used for including in it fluid passages and valves required for the hydrostatic transmission.

The PTO-clutch 42 disposed within the transmission casing 15 may be fashioned without any problem to a fluid-operated frictional clutch which may be engaged in a smooth manner with ease. The rear-PTO shaft 23 which is driven by the drive shaft 41 of a high level through the PTO-clutch 42 and through the gear train 43 may be disposed at an optional level by choosing or adjusting the arrangement of the gear train 43 so that this rear-PTO shaft 23 may be disposed at an appropriate level for transmitting power to an auxiliary implement, such as a grass collector, to be drawn by the vehicle.

A mid-PTO shaft which is used for driving a mid-mount implement is to be disposed at a low level, because a mid-mount implement is mounted at an underside of a vehicle. Consequently, the gear train 43 which is disposed at a rear end portion within the transmission casing 15 for transmitting power to the rear-PTO shaft 23 may be used for a mid-PTO shaft 24, extending forwardly from the transmission casing at a low level, in a fashion such that the mid-PTO shaft is connected drivenly to the gear train 43 at a rear and low portion within the transmission casing 15. Although the transmission mechanism for propelling the vehicle is disposed at a fronter side within the transmission casing, passing of only the mid-PTO shaft is afforded. It is thus seen that a mid-PTO shaft driven by the pump shaft 18 of the hydrostatic transmission may be provided without sacrificing a compactness of the transmission assembly by utilizing the gear train 43 for the rear-PTO shaft.

In an embodiment of the present invention, the mechanical transmission mechanism 21 within the transmission casing 15 is fashioned so as to permit a two-stage change of the rotational speed of the rear wheel axles 20 without unduly lowering the level of the axles. As shown in FIGS. 1 to 3, the transmission mechanism 21 is fashioned to include, as its transmission shafts set forth before, an input shaft 31 which is disposed at a level substantially equal to that of the motor shaft 19 and is connected to the motor shaft through the bevel gearing 34, an intermediate shaft 32 which is disposed rearwardly of the input shaft 31 at a level higher than that of the input shaft, and an output shaft 33 which is disposed co-axially with the input shaft 31 and is connected drivingly to the left and right rear wheel axles 20. A speed-reducing gear train 35 is provided which is operable to transmit rotation of the input shaft 31 to the output shaft 33 through the intermediate shaft 32 with a reduced speed of rotation. A shiftable clutch member 36 is mounted on the output shaft 33 and is fashioned to have a first position, where the clutch member connects the input shaft 31 directly to the output shaft 33, and a second position where the clutch member 36 connects the input shaft 31 to the output shaft 33 through the speed-reducing gearing 35.

According to this structure, the intermediate shaft 32 for the speed-reducing gear train 35 for transmitting rotation from the input shaft 31 to the output shaft 33 with a reduced speed of rotation is located rearwardly and upwardly of the input and output shafts 31 and 33 so as to enlarge the interval between the shafts 31, 33 and 32 and so as to thereby permit to provide a large speed-reducing ratio to the gear train 35. Nevertheless, the interval between the output shaft 33 and rear wheel axles 20 is kept equal to the interval between the input shaft 31 and wheel axles 20 owing to the co-axial arrangement of the input and output shafts 31 and 33 so that the level of the rear wheel axles 20 is not unduly lowered.

In connection with the co-axial arrangement of the shafts 31 and 33 set forth above, it is preferred that the input shaft 31 is formed into a hollow shaft and is rotatably mounted on the output shaft 33. In this case, a simple support structure for the input shaft 31 is provided. Further, when the mechanical transmission mechanism is varied in design so that the mechanism does not perform a speed-change transmission, it may be attained simply by removing the input and intermediate shafts 31 and 32 and by connecting the output shaft 33 to the motor shaft 19 by means of a bevel gearing.

In a case where a differential gearing 37 is disposed, as shown in FIG. 2, within the transmission casing 15 and between the left and right rear wheel axles 20, it is preferred for heightening torque of the rear wheel axles 20 to fixedly mount on the output shaft 33 a small spur gear 38 which meshes with a larger input spur gear 39 of the differential gearing 37.

For an easy assembly and maintenance of the PTO-clutch 42 to be disposed within the transmission casing 15 and also for an easy assembly of the gear train 43 in the power take-off line into the transmission casing, the transmission casing 15 is preferably fashioned, as shown in FIGS. 1 and 4, to include an open rear end, to be closed by a cover member 44, and an internal partition wall 15*a* which is disposed forwardly of the PTO-clutch 42 and rearwardly of the mechanical transmission mechanism 21. The drive shaft 41 and rear-PTO shaft 23 are preferably supported by the cover member 44 and by the partition wall 15*a*, respectively, and the gear train 43 is preferably disposed between the partition wall 15*a* and cover member 44.

According to this structure, the PTO-clutch 42 may be assembled onto the drive shaft 41 through the rear end opening of the transmission casing 15 before the cover member 44 has been attached. The rear-PTO shaft 23 and gear train 43 may previously be supported by the cover member 44 and then may be assembled into the space between the partition wall 15*a* and cover member 44 by attaching the cover member to the rear of the transmission casing. Maintenance with respect to the PTO-clutch 42 may be carried out with ease by removing the cover member 44.

The partition wall 15*a* set forth above may also be used, when the PTO-clutch 42 is fashioned to a fluid-operated frictional clutch, for providing a rotary joint for connecting a clutch-operating fluid passage in the rotatable drive shaft 41 to a stationary or fixed fluid passage. As shown in FIG. 1, the gear train 43 includes an input gear 45 which is rotatably mounted on the drive shaft 41. According to a preferred embodiment of the present invention, the PTO-clutch is fashioned to a fluid-operated frictional clutch which is operable to couple the input gear 45 selectively to the drive shaft 41. This drive shaft includes a fluid passage 46 for operating the clutch 42. A rotary joint for communicating this fluid passage 46 with stationary fluid passage is provided by an annular groove 47, which is formed in an outer circumference of the drive shaft 41, and by a cylindrical portion 48 which is formed in the partition wall 15*a* so as to sealingly cover the annular goove 47.

In a transmission assembly in which a mid-PTO shaft is provided in addition to the rear-PTO shaft, it is preferred, as shown in FIGS. 1 and 4, to mount a final gear 49 of the gear train 43 rotatably on the rear-PTO shaft 23. A rear-PTO clutch 50 is mounted on the rear-PTO shaft 23 for coupling the final gear 49 selectively to the shaft 23. A mid-PTO shaft 24 is disposed at a low level within the transmission casing 15 such that it includes a rear end portion located below the rear-PTO shaft 23 and extends forwardly from the transmission casing at a level below the plate member 30. A gear 51 which is connected drivenly to the final gear 49 on the rear-PTO shaft is rotatably mounted on the mid-PTO shaft 24 and is adapted to be coupled selectively to the mid-PTO shaft by a mid-PTO clutch 52 which is mounted on the shaft 24.

The rear-PTO clutch 50 and mid-PTO clutch 52 set forth above will enable to drive the rear-PTO shaft 23 and mid-PTO shaft 24 independently of each other. The PTO-clutch 42 is once disengaged before operating each of the rear-PTO clutch 50 and mid-PTO clutch 52 for smoothening the operation and for preventing clutch elements of the clutches 50 and 52 from being damaged.

In a vehicle which is used only for working purposes by means of mid-mount auxiliary implements, only a mid-PTO shaft is provided and a rear-PTO shaft is not required. In such vehicle, it is preferred, as shown in FIG. 6, that a mid-PTO shaft 24 is provided which extends forwardly from a rear and lower portion within the transmission casing 15 and projects forwardly from the transmission casing at a level below the plate member 30. The gear train 143 preferably includes an input gear 145, rotatably mounted on the drive shaft 41, and a final gear 151 which is fixedly mounted on the mid-PTO shaft 24. The PTO-clutch 42 is fashioned to a fluid-operated frictional clutch which is operable to couple the input gear 145 selectively to the drive shaft 41.

According to this structure, the fluid-operated frictional clutch 42 which may be engaged in a smooth manner using a valve is exclusively and conveniently used for the mid-PTO shaft 24.

DESCRIPTION OF PREFERRED EMBODIMENTS

Figure 5:
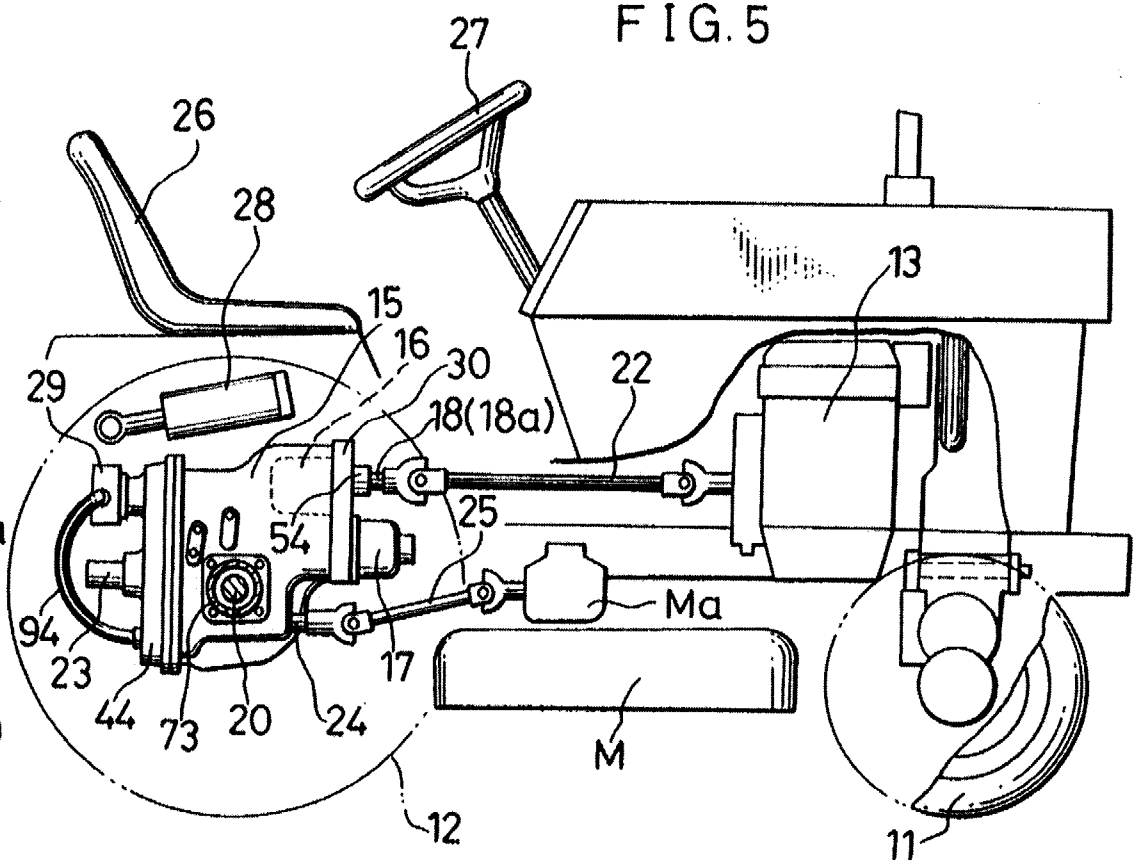
FIG. 5 is a schematic side view, partially cut away, of a mower tractor in which the first embodiment is employed.

The first embodiment shown in FIGS. 1 to 4 is employed in a mower tractor shown in FIG. 5 which is equipped with a mid-mount mower M at an underside of the vehicle and between pairs of front wheels 11 and rear wheels 12.

As shown in FIG. 5, an engine 13 is mounted on a front portion of the vehicle. Power is supplied from this engine 13 to the pump shaft 18 of the hydrostatic transmission 14, referred to before, through a transmission shaft 22 which extends axially of the vehicle. The mid-PTO shaft 24 is used for transmitting mower-driving power to a gear box Ma of the mower M through a transmission shaft 25.

A seat 26 is disposed above the transmission casing 15 and a steering wheel 27 for operating the front wheels 11 to turn is located before the seat 21. A pair of single-acting hydraulic cylinders 28 are disposed between the transmission casing 15 and seat 26 for lifting and lowering a grass collector or the like which is to be driven by the rear-PTO shaft 23. A hydraulic pump 29 for supplying fluid under pressure to the cylinders 28 is mounted on a rear of the transmission casing 15.

As shown in FIG. 1, the hydraulic pump 16 and hydraulic motor 17 of the hydrostatic transmission 14 each having its own casing are mounted on the plate member 30, having a relatively large thickness, in the arrangement having been detailed before. A charge pump 54 for supplementing fluid to a closed circuit (not shown) between the hydraulic pump 16 and motor 17 is fashioned to a trochoid pump, which is constructed by employing as its pump shaft the pump shaft 18 of the hydraulic pump 16, and is mounted on the front surface of the plate member 30. An extension shaft 56 is coupled to the motor shaft 19 at a location within the plate member 30 using a coupling sleeve 55 and has at its rear end an integral bevel gear 34A which constitutes a gear of the drive side of the bevel gearing 34. As is usual, the hydraulic pump 16 is fashioned to a variable displacement pump including a swash plate 16*a* shown in FIG. 2 the inclination of which may be varied through a control arm 58 attached to a control shaft 57 which extends through a side wall of the transmission casing 15. The hydrostatic transmission 14 will vary the vehicle speed in response to the change of inclination angle of the swash plate 16*a* in a non-stepwise manner with a selective reversing of the vehicle.

As shown in FIGS. 2 and 3, the input shaft 31 of the mechanical transmission mechanism 21 is made of a hollow shaft having a small length and is rotatably mounted on the output shaft 33 which is supported by the side walls of the transmission casing 15. The intermediate shaft 32 which is disposed, as shown in FIG. 1, rearwardly and upwardly of the input and output shafts 31 and 33 is supported by the side walls of the transmission casing, as shown in FIG. 3. A bevel gear 34B which constitutes a gear of the driven side of the bevel gearing 34 is fixedly mounted on the input shaft 31 and meshes with the bevel gear 34A, as shown in FIG. 1. As shown in FIGS. 1 to 3, the speed-reducing gear train 35 referred to before comprises a first reduction train of meshing gears 60 and 61, which are fixedly mounted respectively on the input shaft 31 and intermediate shaft 32, and a second reduction train of meshing gears 62 and 63. One of the gears 62 of the second reduction train is fixedly mounted on the intermediate shaft 32, whereas the other gear 63 is formed integral with the clutch member 36. The clutch member 36 is slidably but non-rotatably mounted on a splined sleeve 64 which is in turn fixedly mounted on the output shaft 33. This clutch member 36 may be shifted to a position shown in FIG. 3, where gear 63 is engaged with the gear 62 so as to place the speed-reducing gear train 35 into its operative condition, and to another position where the clutch member is engaged with both of splines formed in the outer circumferences of the input and output shafts 31 and 33 so as to connect the output shaft directly to the input shaft.

For operating the clutch member 36 to displace between the two positions set forth above, a shifter fork 65 shown in FIGS. 1 and 3 is fixedly mounted on a fork shaft 66 which is slidably supported by the side walls of the transmission casing 15. As shown in FIG. 3, a rotatable control shaft 67 which extends through a top wall of the transmission casing 15 carries at its inner end an eccentric shifter pin 68, engaging the shifter fork 65, and at its outer end a shifter arm 69. The arrangement of this shifting mechanism is such that, when the shifter arm 69 is operated so as to rotate about the axis of the control shaft 67, the shifter fork 65 is slidingly displaced together with the fork shaft 66 in a lateral direction of the transmission casing so as to displace the clutch member 36. A latching means 70 is associated to the fork shaft 66, as shown in FIG. 3.

As shown in FIGS. 2 and 3, a frictional brake 71 for braking the output shaft is disposed at one end portion of this shaft 33. This brake is operated through a cam mechanism including balls 71*a*.

As shown in FIG. 2, the differential gearing 37 referred to before is disposed in a lower portion within the transmission casing 15 at a location nearer to one of the side walls of the transmission casing. The input spur gear 39 is attached to a differential casing 37*a* using bolts 72 and is engaged with the smaller spur gear 38 which is formed integral with the output shaft 33. The left and right wheel axles 20 extending leftwards and rightwards from the differential casing 37*a* are supported respectively by left and right axle cases 73, attached to the sides of transmission casing, and have at their outer ends rear wheel-attaching flanges 20*a*, as shown in FIG. 2 with respect to the rear wheel axle 20 of one side. As also shown in FIG. 2, a differential-locking clutch member 74 is mounted on the rear wheel axle 20 of one side and has a locking pin 74*a* which, when projected into the differential casing 37*a*, locks a differential gear to the casing 37*a*. This clutch member 74 is operated to slide by a fork 76 shown in FIG. 1 which is slidably mounted on a guide shaft 75 extending laterally of the transmission casing 15.

Referring to the power take-off transmission mechanism, the drive shaft 41 set forth before is coupled to the pump shaft 18, as shown in FIG. 1, at a location before the cylindrical portion 48 of the partition wall 15*a* using a coupling sleeve 48. A clutch housing 78 is fixedly mounted on the drive shaft 41 at a location behind the partition wall 15*a*. The PTO-clutch 42 is fashioned to a fluid-operated frictional clutch comprising opposite sets of frictional elements which are slidably but non-rotatably supported by the clutch housing 78 and by the input gear 45 of the gear train 43. As is usual, the fluid-operated PTO-clutch 42 further comprises a piston 80 which is disposed within the clutch housing 78 and is biased to move away from the frictional elements by a return spring 79. The clutch 42 is engaged by fluid under pressure, supplied through the fluid passage 46 in the drive shaft 41, which causes the piston 80 to move toward the frictional elements against the biasing force of return spring 79.

As shown in FIGS. 1 and 4, an intermediate shaft 81 having a small length is disposed at a level between the drive shaft 41 and rear-PTO shaft 23 and is rotatably supported by the partition wall 15*a* and by the cover member 44. The gear train 43 includes two gears 82 and 83, fixedly mounted on the intermediate shaft 81, one of which meshes with gear 45 on the drive shaft 41 and the other of which meshes with gear 49 rotatably mounted on the rear-PTO shaft 23.

The rear-PTO shaft 23 shown in formed to a hollow shaft which includes in its rear end portion internal splines 23*a* for connecting a joint (not shown). The inner end of this hollow shaft is closed using an internal cover 84. The rear-PTO clutch 50 comprises a clutch member 50*a* which is slidably but non-rotatably mounted on the rear-PTO shaft 23 and is operable to couple the gear 49 selectively to the shaft 23. Gear 51 is rotatably mounted on the mid-PTO shaft 24 and meshes directly with the gear 49. The mid-PTO clutch 52 comprises a clutch member 52*a* which is slidably but non-rotatably mounted on the mid-PTO shaft 24 and is operable to couple the gear 51 selectively to the shaft 24. As shown in FIG. 2, the mid-PTO shaft 24 is disposed in a lower portion within the transmission casing 15 at a side opposite to the differential gearing 37. The inner bottom wall of the transmission casing 15 includes at a location below the rear wheel axle 20 of one side an elongated groove 85 within which a lower half of the mid-PTO shaft 24 is located.

The clutch members 50*a* and 52*a* of the rear-PTO clutch 50 and mid-PTO clutch 52 are operated to slide respectively by shifter forks 87 and 88, shown in FIG. 4, mounted slidably on guide shafts 85 and 86 which extend axially of the transmission casing, respectively. Rotatable control shafts 89 and 90 extend respectively through a side wall of the transmission casing 15 and carry at their inner ends respectively arms 89*a* and 90*a* which have shift pins engaging the respective shifter forks 87 and 88. The control shafts 89 and 90 carry at their outer ends clutch arms 89*a* and 90*b*, respectively.

In FIG. 2, numeral 91 designates an oil filter which is disposed at a deepest portion within the transmission casing 15. This oil filter 91 includes outlets (not shown)

for filtered oil at both of its front and rear ends. The front outlet is communicated through a fluid passage (not shown) in the front wall of the transmission casing to a fluid passage (a part of which is shown in FIG. 1) in the plate member 30 and then to the charge pump 54. The charge pump 54 shown is used not only for supplementing fluid into the closed circuit or fluid path between the hydraulic pump 16 and motor 17 but for supplying clutch-operating fluid to the PTO-clutch 42. As shown in FIG. 2, one of the side walls of the transmission casing 15 includes a fluid passage 92 which is communicated to an outlet port of the charge pump 54 through a fluid passage (a part of which is shown in FIG. 1) in the plate member 30. The fluid passage 92 is connected to the rotary joint, referred to before, within the cylindrical portion 48 through a fluid passage 93 which is formed in an internal wall between the side wall and partition wall 15a of the transmission casing. The rear outlet of the oil filter 91 is connected to the pump 29 for the hydraulic cylinders 28 through a pipe 94 shown in FIGS. 4 and 5. As shown in FIG. 1, the pump 29 has a pump shaft 29a, coupled to the drive shaft 41 using a coupling sleeve 95, and is driven by the drive shaft.

The mower tractor shown in FIG. 5 is used for various working purposes with travelling the vehicle by driving left and right rear wheels 12. In such use, the vehicle is travelled at a speed controlled by the hydrostatic transmission 14, which varies the speed indefinitely with a selective reverse of travelling direction, and by the mechanical transmission mechanism 21 which varies the speed in two stages. The brake 71 shown in FIGS. 2 and 3 is used for braking the vehicle during its travel and when the vehicle is to be parked, whereas the differential-locking clutch mechanism having the clutch member 74 shown in FIG. 2 is used for disabling the differential gearing when the vehicle meets with the earch of a bad condition or the like.

When a mowing operation is carried out using the mower M shown in FIG. 5, the mid-PTO clutch 52 shown in FIG. 1 is engaged, and when the mowed grass is to be collected at the same time by a grass collector which is drawn by the vehicle and is driven by the rear-PTO shaft 23, the rear-PTO clutch 50 is also engaged. Besides, the rear-PTO shaft 23 is used for taking-off a required power when a stationary working by means of a sprayer or the like is carried out or when the vehicle is used for a working purpose by means of an auxiliary implement to be drawn by the vehicle such as a fertilizing implement, seeding implement, tiller or the like. As already described, the PTO-rotary clutch 42 is once disengaged prior to an operation of the rear-PTO clutch 50 or mid-PTO clutch 52.

Referring now to FIG. 6, there is shown a second embodiment of the present invention in which only a mid-PTO shaft 24 is provided.

In this second embodiment, a gear train 143 which is disposed at a rear end portion within the transmission casing 15 and between the partition wall 15a and a rear end cover member 144 comprises an input gear 145, which is rotatably mounted on the drive shaft 41 and may be coupled selectively to this shaft by a fluid-operated frictional PTO-clutch 42, an intermediate gear 182 which is supported at its integral fronter and rearer shaft portions by the partition wall 15a and by the cover member 144 and meshes with the input gear 145, and a final gear 151 which is fixedly mounted on the mid-PTO shaft 24 and meshes with the intermediate gear 182. As shown, the input gear 145 is fashioned to have a thickness larger than the intermediate gear 182 by a reason which will be detailed later.

In the second embodiment shown in FIG. 6, a cylindrical portion corresponding to the cylindrical portion 48 shown in FIGS. 1 and 2 is not formed in the partition wall 15a. In place of it, the cover member 144 is provided with an integral cylindrical portion 148 in which a rear end portion of the drive shaft 41 is received. Within this cylindrical portion 148, a fluid chamber 147 is formed for connecting the fluid passage 46 in the rotatable drive shaft 41 to a stationary fluid passage 193. Fluid passages 192A and 192B which correspond to the fluid passage 92 shown in FIG. 2 are formed respectively in a side wall of the transmission casing 15 and in the cover member 144 and are communicated to the fluid passage 193 set forth above. Also, motor shaft 19 of the hydrostatic transmission 14 employed in the second embodiment has a length larger than that of the motor shaft 19 shown in FIG. 1 and extends into the transmission casing. A bevel gear 34A of the drive side of the bevel gearing 34 is fixedly mounted on a rear end portion of the motor shaft 19.

The other parts of the second embodiment are fashioned similarly to the corresponding parts of the first embodiment and are designated by like numerals.

In the second embodiment, the fluid-operated PTO-clutch is used exclusively for the mid-PTO shaft 24.

FIG. 7 shows a modification in which a rear-PTO shaft 23 is additionally provided to the structure shown in FIG. 6.

In this modification, a rear end cover member 244 for the transmission casing 15 is employed which includes an integral cylindrical portion 148 corresponding to the cylindrical portion 148 of the cover member 144 shown in FIG. 6 but which has at its portion below the cylindrical portion 148 an axial depth larger than that of the cover member 144 shown in FIG. 6. A gear train 243 which corresponds to the gear train 143 shown in FIG. 6 comprises an input gear 145 rotatably mounted on the drive shaft 41, an intermediate gear 282 rotatably mounted on the rear-PTO shaft 23, and a final gear 251 rotatably mounted on the mid-PTO shaft 24. On the mid-PTO shaft, a splined sleeve 201 is fixedly mounted on which a clutch member 252a is in turn slidably but non-rotatably mounted so as to provide a mid-PTO clutch 252 for coupling the gear 251 selectively to the mid-PTO shaft 24.

Between the drive shaft 41 and rear-PTO shaft 23, another gear train 202 is disposed which comprises the input gear 145 set forth above, a gear 249 rotatably mounted on the rear-PTO shaft 23, and an intermediate gear (not shown) which meshes with both of the gears 145 and 249. For the purpose of providing this another gear train 202 by employing the input gear 145 as it is, the thickness of the corresponding gear 145 is made larger than required in the device shown in FIG. 6. Further, diameter D of the fronter shaft portion of the intermediate gear 182 shown in FIG. 6 is made equal to the outer diameter D of an inner end portion of the rear-PTO shaft 23 shown in FIG. 7 so that a shaft-supporting portion formed in the partition wall 15a may be commonly used for the intermediate gear 182 shown in FIG. 6 and for the rear-PTO shaft 23 shown in FIG. 7. A rear-PTO clutch 250 having a slidable clutch member 250a is mounted on the rear-PTO shaft 23 for coupling the gear 249 selectively to this shaft 23.

The rear-PTO clutch 250 and mid-PTO clutch 252 shown in FIG. 7 are used respectively in the same manner as described before with respect to the corresponding clutches 50 and 52 employed in the first embodiment.

We claim:

1. A vehicle transmission assembly comprising a hydrostatic transmission, which includes a hydraulic pump having a pump shaft and a hydraulic motor having a motor shaft, and a mechanical transmission mechanism disposed within a transmission casing for transmitting vehicle-driving power to left and right rear wheel axles which are supported by said transmission casing, said motor shaft being connected drivingly to said rear wheel axles through said mechanical transmission mechanism, at least one of a rear-PTO shaft and mid-PTO shaft for taking-off auxiliary implement-driving power being supported by said transmission casing and connected drivenly to said pump shaft, characterized in:

that a plate member (30) is fixedly secured to a front of said transmission casing (15), said hydraulic pump (16) being mounted on a rear surface of said plate member and disposed at an upper portion within said transmission casing such that an input end (18*a*) of said pump shaft (18) extends forwardly of said plate member, and said hydraulic motor (17) being mounted on a front surface of said plate member at a level lower than said level of said hydraulic pump such that said motor shaft (19) extends rearwardly from said motor;

that said mechanical transmission mechanism (21) is disposed at a level lower than said level of said hydraulic pump (16) and is fashioned to include plural transmission shafts (31, 32, 33) all of which extend leftwards and rightwards of said transmission casing (15), said mechanical transmission mechanism being connected to said motor shaft (19) through a bevel gearing (34); and that a drive shaft (41) is disposed within said transmission casing (15) rearwardly of said hydraulic pump (16) and co-axially with said pump shaft (18), said pump shaft extending rearwardly from said hydraulic pump and being coupled to said drive shaft, and said drive shaft being connected drivingly to said one PTO shaft (23; 24) through a PTO-clutch (42) mounted on said drive shaft and through a gear train (43; 143; 243) which is disposed at a rear end portion within said transmission casing.

2. A vehicle transmission assembly as set forth in claim 1, wherein said mechanical transmission mechanism (21) includes, as said transmission shafts, an input shaft (31) which is disposed at a level substantially equal to said level of said motor shaft (19) and is connected to said motor shaft through said bevel gearing (34), an intermediate shaft (32) which is disposed rearwardly of said input shaft at a level higher than said level of said input shaft, and an output shaft (33) which is disposed co-axially with said input shaft and is connected drivingly to said left and right rear wheel axles (20), and wherein a speed-reducing gear train (35) is provided which is operable to transmit rotation of said input shaft to said output shaft through said intermediate shaft with a reduced speed of rotation, a shiftable clutch member (36) being mounted on said output shaft and having a first position, where said clutch member connects said input shaft directly to said output shaft, and a second position where said clutch member connects said input shaft to said output shaft through said speed-reducing gear train.

3. A vehicle transmission assembly as set forth in claim 2, wherein said input shaft (31) is formed into a hollow shaft and is rotatably mounted on said output shaft (33).

4. A vehicle transmission assembly as set forth in claim 2, wherein a differential gearing (37) is disposed within said transmission casing (15) and between said left and right rear wheel axles (20), said output shaft (33) fixedly carrying a spur gear (38) which meshes with a larger input spur gear (39) of said differential gearing.

5. A vehicle transmission assembly as set forth in claim 1, wherein said transmission casing (15) has an open rear end closed by a cover member (44) and includes an internal partition wall (15*a*) which is disposed forwardly of said PTO-clutch (42) and rearwardly of said mechanical transmission mechanism (21), said drive shaft (41) and a rear-PTO shaft (23) being supported by said cover member and by said partition wall, respectively, and said gear train (43) for connecting between said drive shaft and said rear-PTO shaft being disposed between said partition wall and said cover member.

6. A vehicle transmission assembly as set forth in claim 5, wherein said gear train (43) includes an input gear (45) which is rotatably mounted on said drive shaft (41), said PTO-clutch being fashioned to a fluid-operated frictional clutch (42) for selectively coupling said input gear to said drive shaft and said drive shaft including a fluid passage (46) for operating said fluid-operated frictional clutch, a rotary joint for communicating said fluid passage with a stationary fluid passage being provided by an annular groove (47) formed in an outer circumference of said drive shaft and by a cylindrical portion (48) formed in said partition wall (15*a*) so as to sealingly cover said annular groove.

7. A vehicle transmission assembly as set forth in claim 1, which includes both of said rear-PTO shaft (23) and mid-PTO shaft (24), said rear-PTO shaft extending rearwardly from said transmission casing (15), whereas said mid-PTO shaft having a rear end portion disposed below said rear-PTO shaft and extending forwardly from said transmission casing at a level below said plate member (30), and wherein said gear train (43) includes a final gear (49) which is rotatably mounted on said rear-PTO shaft and is adapted to be coupled selectively to said rear-PTO shaft by a rear-PTO clutch (50) mounted on said rear-PTO shaft, whereas a gear (51) drivenly connected to said final gear is rotatably mounted on said mid-PTO shaft and is adapted to be coupled selectively to said mid-PTO shaft by a mid-PTO clutch (52) mounted on said mid-PTO shaft.

8. A vehicle transmission assembly as set forth in claim 1, wherein a mid-PTO shaft (24) is provided which extends forwardly from a rear and lower portion within said transmission casing (15) and projects forwardly from said transmission casing at a level below said plate member (30), and wherein said gear train (143) includes an input gear (145) rotatably mounted on said drive shaft (41) and a final gear (151) fixedly mounted on said mid-PTO shaft, said PTO-clutch being fashioned to a fluid-operated frictional clutch (42) which is operable to couple said input gear selectively to said drive shaft.

*9. In a vehicle transmission assembly comprising: a power input shaft (18) to be connected drivenly to a prime mover (13); a hydrostatic transmission (14) having a hydraulic pump (16) driven by said power input shaft and a*

*hydraulic motor (17) connected in closed fluid circuit to said hydraulic pump so as to be driven by said pump, said hydrostatic transmission including an output shaft (19); a transmission casing (15) supporting left and right wheel axles (20); a mechanical transmission mechanism (21) disposed within said transmission casing for transmitting vehicle-driving power from said output shaft to said left and right wheel axles; and a PTO-shaft (23) supported by said transmission casing so as to extend outwardly of said casing for taking-off auxiliary implement-driving power, said PTO-shaft being drivenly connected to said power input shaft through a PTO-clutch (42), the improvement characterized in:*

*that said hydrostatic transmission (14) includes a plate-shaped support member (30) which includes therein fluid passages and is attached to a front of said transmission casing (15);*

*that said transmission casing (15) includes a shaft-supporting internal partition wall (15a), a front end opening covered by said plate-shaped support member (30), and a rear end opening closed by a cover member (44; 244) attached to a rear of said transmission casing;*

*that said hydraulic pump (16) is mounted on a rear surface of said plate-shaped support member (30), said pump and said mechanical transmission mechanism (21) being disposed within said transmission casing (15) at a location before said internal partition wall (15a); and*

*that said PTO-shaft (23) is disposed behind said internal partition wall (15a) and is connected to said PTO-clutch (42) through a gear train (43; 243), said PTO-clutch and said gear train being disposed between said internal partition wall and said cover member (44; 244).*

*10. A vehicle transmission assembly as set forth in claim 9, wherein a differential gearing (37) for providing a rotational differential to said left and right wheel axles (20) is disposed within said transmission casing (15) at a location before said internal partition wall (15a), said mechanical transmission mechanism (21) including a transmission shaft (33) which extends leftwards and rightwards of said transmission casing and has thereon a co-rotatable spur gear (38)said spur gear meshing with a larger input spur gear (39) of said differential gearing.*

*11. A vehicle transmission assembly as set forth in claim 9, wherein a second PTO-shaft (24)* is supported by said transmission casing *(15) and has one end extending outwardly of said casing at an opposite side of said PTO-shaft (23), a gear (51; 251) for driving said second PTO-shaft being mounted on the other end of second PTO-shaft and being meshed with a gear (49; 282)* of said gear train *(43; 243).*

*12. A vehicle transmission assembly as set forth in claim 9, wherein said PTO-clutch is fashioned to a fluid-operated frictional clutch (42) mounted on a drive shaft (41)* which is drivenly connected to said power input shaft *(18) and includes therein a fluid passage (46) for operating said fluid-operated frictional clutch, a rotary joint for communicating said fluid passage with a stationary fluid passage (93) being provided by an annular groove (47) formed in an outer circumference of said drive and by a cylindrical portion (48) formed in said internal partition wall (15a) so as to sealingly cover said annular groove.*

*13. A vehicle transmission assembly as set forth in claim 9, wherein said PTO-clutch is fashioned to a fluid-operated frictional clutch (42) mounted on a drive shaft (41) which is drivenly connected to said power input shaft (18) and includes therein a fluid passage (46) for operating said fluid-operated frictional clutch, a rotary joint for communicating said fluid passage with a stationary fluid passage (193) being provided by a fluid chamber (147) which is defined by a cylindrical portion (148) formed in said cover member (244) and by a rear end face of said drive shaft.*

*14. In a vehicle transmission assembly comprising: a power input shaft (18) to be connected drivenly to a prime mover (13); a hydrostatic transmission (14) having a hydraulic pump (16) driven by said power input shaft and a hydraulic motor (17) connected in closed fluid circuit to said hydraulic pump so as to be driven by said pump, said hydrostatic transmission including an output shaft (19); a transmission casing (15) supporting left and right wheel axles (20); a mechanical transmission mechanism (21) disposed within said transmission casing for transmitting vehicle-driving power from said output shaft to said left and right wheel axles; and a PTO-shaft (23) supported by said transmission casing so as to extend outwardly of said casing for taking-off auxiliary implement-driving power, said PTO-shaft being drivenly connected to said power input shaft, the improvement characterized in:*

*that said hydrostatic transmission (14) includes a plate-shaped support member (30) which includes therein fluid passages and is attached to a front of said transmission casing (15);*

*that said transmission casing (15) includes a shaft-supporting internal partition wall (15a) and a front end opening, said front end opening being covered by said plate-shaped support member (30); and*

*that said hydraulic pump (16) is housed within its own casing and is mounted on a rear surface of said plate-shaped support member (30) together with said own casing such that said hydraulic pump is disposed within said transmission casing (15) and between said support member and said internal partition wall (15a).*

*15. A vehicle transmission assembly as set forth in claim 14, wherein said hydraulic pump (16) has a pump shaft (18) which is supported at its one end by said plate-shaped support member (30) and at the other end by said own casing.*

*16. A vehicle transmission assembly as set forth in claim 14, wherein said hydraulic pump (16) is mounted on said rear surface of said plate-shaped support member (30) at an upper half of said support member.*

*17. In a vehicle transmission assembly comprising: a power input shaft (18) to be connected drivenly to a prime mover (13); a hydrostatic transmission (14) having a hydraulic pump (16) driven by said power input shaft and a hydraulic motor (17) connected in closed fluid circuit to said hydraulic pump so as to be driven by said pump, said hydrostatic transmission including an output shaft (19); a transmission casing (15) supporting left and right wheel axles (20); a mechanical transmission mechanism (21) disposed within said transmission casing for transmitting vehicle-driving power from said output shaft to said left and right wheel axles; and a PTO-shaft (23) supported by said transmission casing so as to extend outwardly of said casing for taking-off auxiliary implement-driving power, said PTO-shaft being drivenly connected to said power input shaft, the improvement characterized in:*

*that said hydrostatic transmission (14) includes a plate-shaped support member (30) which includes therein fluid passages and is attached to a front of said transmission casing (15);*

*that said transmission casing (15) includes a shaft-supporting internal partition wall (15a) and a front end*

*opening, said front end opening being covered by said plate-shaped support member (30);*

*that said hydraulic pump (16) is mounted on a rear surface of said plate-shaped support member (30) such that said hydraulic pump is disposed within said transmission casing (15) and between said support member and said internal partition wall (15a); and*

*that said hydraulic pump (16) further includes a tiltable swash plate (16a) which is operatively connected at an inside of said transmission casing (15) to a control shaft (57), said control shaft extending through a side wall of said transmission casing and having at its outer end a control arm (58) attached thereto.*

*18. In a vehicle transmission assembly comprising: a power input shaft (18) to be connected drivenly to a prime mover ( 13); a hydrostatic transmission (14) having a hydraulic pump (16) driven by said power input shaft and a hydraulic motor (17) connected in closed fluid circuit to said hydraulic pump so as to be driven by said pump, said hydrostatic transmission including an output shaft (19); a transmission casing (15) supporting left and right wheel axles (20); a mechanical transmission mechanism (21) disposed within said transmission casing for transmitting vehicle-driving power from said output shaft to said left and right wheel axles; and a PTO-shaft (23) supported by said transmission casing so as to extend outwardly of said casing for taking-off auxiliary implement-driving power, said PTO-shaft being drivenly connected to said power input shaft through a PTO-clutch (42), the improvement characterized in:*

*that said hydrostatic transmission (14) includes a plate-shaped support member (30) which includes therein fluid passages and is attached to a front of said transmission casing (15);*

*that said transmission casing (15) includes a shaft-supporting internal partition wall (15a), a front end opening covered by said plate-shaped support member (30), and a rear end opening closed by a cover member (44) attached to a rear of said transmission casing;*

*that said hydraulic pump (16) is mounted on a rear surface of said plate-shaped support member (30), said pump and said mechanical transmission mechanism (21) being disposed within said transmission casing (15) at a location before said internal partition wall (15a);*

*that said PTO-shatt (23) is disposed behind said internal partition wall (15a) and and is connected to said PTO-clutch (42) through a gear train (43), said PTO-clutch and said gear train being disposed between said internal partition wall and said cover member (44); and*

*that another hydraulic pump (29) is mounted on a rear of said cover member (44) and has a pump shaft (29a) which extends into said transmission casing (15) through an opening formed in said cover member, said pump shaft being connected drivenly to said power input shaft (18).*

*19. In a vehicle transmission assembly comprising: a power input shaft (18) to be connected drivenly to a prime mover (13); a hydrostatic transmission (14) having a hydraulic pump (16) driven by said power input shaft and a hydraulic motor (17) connected in closed fluid circuit to said hydraulic pump so as to be driven by said pump, said hydrostatic transmission including an output shaft (19); a transmission casing (15) supporting left and right wheel axles (20); a mechanical transmission mechanism (21) disposed within said transmission casing for transmitting vehicle-driving power from said output shaft to said left and right wheel axles; and a PTO-shaft (23) supported by said transmission casing so as to extend outwardly of said casing for taking-off auxiliary implement-driving power, said PTO-shaft being drivenly connected to said power input shaft, the improvement characterized in:*

*that said hydrostatic transmission (14) includes a plate-shaped support member (30) which includes therein fluid passages and is attached to a front of said transmission casing (15);*

*that said transmission casing (15) includes a shaft-supporting internal partition wall (15a) and a front end opening, said front end opening being covered by said plate-shaped support member (30);*

*that said hydraulic pump (16) is mounted on a rear surface of said plate-shaped support member (30) such that said hydraulic pump is disposed within said transmission casing (15) and between said support member and said internal partition wall (15a); and*

*that a charge pump (54) for supplementing fluid to said closed fluid circuit between said hydraulic pump (16) and said hydraulic motor (17) is mounted on a front of said plate-shaped support member (30) and is drivenly connected to said power input shaft (18).*

* * * * *

UNITED STATES PATENT AND TRADEMARK OFFICE

CERTIFICATE OF CORRECTION

PATENT NO. : RE 34,833

DATED : January 17, 1995

INVENTOR(S) : Toshiyuki Hasegawa et al.

It is certified that error appears in the above-indentified patent and that said Letters Patent is hereby corrected as shown below:

In claim 12, column 15, line 61, after "drive" insert -- shaft --.

Signed and Sealed this

Twenty-fifth Day of April, 1995

*Attest:*

Bruce Lehman

BRUCE LEHMAN

*Attesting Officer*

*Commissioner of Patents and Trademarks*